US011788814B2

(12) United States Patent
Buchanan

(10) Patent No.: US 11,788,814 B2
(45) Date of Patent: Oct. 17, 2023

(54) BOLT LOADER PLIERS AND METHOD OF USE THEREOF

(71) Applicant: Howard Andrew Buchanan, Asheville, NC (US)

(72) Inventor: Howard Andrew Buchanan, Asheville, NC (US)

(73) Assignee: CenterCross Archery LLC, Burnsville, NC (US)

( * ) Notice: Subject to any disclaimer, the term of this patent is extended or adjusted under 35 U.S.C. 154(b) by 129 days.

(21) Appl. No.: 17/113,629

(22) Filed: Dec. 7, 2020

(65) Prior Publication Data

US 2021/0172698 A1    Jun. 10, 2021

Related U.S. Application Data

(60) Provisional application No. 62/945,143, filed on Dec. 7, 2019.

(51) Int. Cl.
| | | |
|---|---|---|
| *F41B 5/12* | (2006.01) | |
| *B25B 7/02* | (2006.01) | |
| *B25J 1/02* | (2006.01) | |
| *F41B 5/14* | (2006.01) | |

(52) U.S. Cl.
CPC .................. *F41B 5/12* (2013.01); *B25B 7/02* (2013.01); *B25J 1/02* (2013.01); *F41B 5/1465* (2013.01)

(58) Field of Classification Search
CPC .......... F41B 5/12; F41B 5/126; F41B 5/1465; F41B 5/148; B66D 3/02; B25B 7/02; B25B 7/22; B25J 1/02
See application file for complete search history.

(56) References Cited

U.S. PATENT DOCUMENTS

| | | | | | |
|---|---|---|---|---|---|
| 25,709 | A | * | 10/1859 | Allen et al. .............. | F16G 11/10 24/DIG. 22 |
| 119,912 | A | * | 10/1871 | Atherton .................. | A47J 45/10 294/28 |
| 297,788 | A | * | 4/1884 | Green ...................... | B65G 7/12 294/902 |
| 1,500,308 | A | * | 7/1924 | Goldberg ................ | A47J 45/10 294/28 |
| 2,234,026 | A | * | 3/1941 | Smith ...................... | H01K 3/32 81/53.11 |
| 2,559,978 | A | * | 7/1951 | Marco ...................... | B25B 7/02 294/28 |

(Continued)

*Primary Examiner* — John A Ricci
(74) *Attorney, Agent, or Firm* — Technology Law, PLLC; Robert C. Corbett

(57) ABSTRACT

An apparatus for loading a crossbow includes a first member having a first portion defining a first handle and a second portion defining a first hollow semi-cylinder. A second member has a third portion defining a second handle and a fourth portion defining a second hollow semi-cylinder. The first and second members are rotatable with respect to each other about an axis. The first member is selectively rotatable with respect to the second member about the axis between a first position and a second position. The first hollow semi-cylinder and the second hollow semi-cylinder cooperate to define a hollow cylinder when the first member is in the first position with respect to the second member. The first hollow semi-cylinder and the second hollow semi-cylinder are separated when the first member is in the second position with respect to the second member.

8 Claims, 7 Drawing Sheets

(56) References Cited

U.S. PATENT DOCUMENTS

| | | | | |
|---|---|---|---|---|
| 2,814,963 A | * | 12/1957 | Harrington | B25B 7/02 |
| | | | | D8/52 |
| 6,868,845 B1 | * | 3/2005 | Moore | F41B 5/10 |
| | | | | 124/25 |
| 8,454,070 B2 | * | 6/2013 | Bierfreund | F41B 5/1465 |
| | | | | 294/902 |
| 9,126,311 B2 | * | 9/2015 | Bednar | B25B 7/02 |
| 9,303,947 B2 | * | 4/2016 | Warner | B25F 1/003 |

* cited by examiner

BOLT LOADER PLIERS AND METHOD OF USE THEREOF

CROSS-REFERENCE TO RELATED APPLICATION

This application claims the benefit of U.S. Provisional Patent Application No. 62/945,143, filed Dec. 7, 2019, and which is hereby incorporated by reference in its entirety.

TECHNICAL FIELD

This disclosure relates to crossbow bolts and their use.

BACKGROUND OF THE INVENTION

Crossbows are often used for hunting or other shooting sports. Crossbows include a bow portion, sometimes referred to as a "lath" or a "prod," mounted with respect to a stock. A bowstring is mounted to the bow portion and is extendable to a "cocked" position. Movement of the bowstring to the cocked position elastically deforms the bow portion. A mechanism locks the bowstring in the "cocked" position such that the bow portion stores a large amount of potential kinetic energy.

Crossbows also include a rail defining a groove. A projectile, typically referred to as a "bolt," is loaded by placing the projectile at least partially within the groove and in engagement with the cocked bowstring. The bowstring is released from its cocked position by pulling a trigger, which causes the bowstring to transfer the stored kinetic energy to the bolt, which is then launched from the crossbow.

SUMMARY

An apparatus for loading a crossbow is provided herein. The apparatus includes a first member having a first portion defining a first handle and a second portion defining a first hollow semi-cylinder. A second member has a third portion defining a second handle and a fourth portion defining a second hollow semi-cylinder. A pivot pin connects the first member to the second member such that the first and second members are rotatable with respect to each other about an axis.

The first member is selectively rotatable with respect to the second member about the axis between a first position and a second position. The first hollow semi-cylinder and the second hollow semi-cylinder cooperate to define a hollow cylinder when the first member is in the first position with respect to the second member. The first hollow semi-cylinder and the second hollow semi-cylinder are separated when the first member is in the second position with respect to the second member.

The apparatus may be used in a method in which a crossbow bolt is placed between the first and second semi-cylinders, and the handles are moved to cause the semi-cylinders to form the cylinder, thereby retaining the bolt. The apparatus may then be used to load the bolt onto a cocked crossbow. The apparatus improves upon the prior art by improving the safety of loading of a crossbow bolt. More specifically, the handle portion, which is held or grasped by the hand of the user, remains outside the travel path of the bowstring; accordingly, in the event of a crossbow malfunction in which the bowstring is released during the loading of the bolt, the user's hands are safely away from the bowstring as it travels from its cocked position to its uncocked position. The energy stored by the crossbow is sufficient to cause severe injury if the bowstring contacts the user's hands.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

Figure 1:
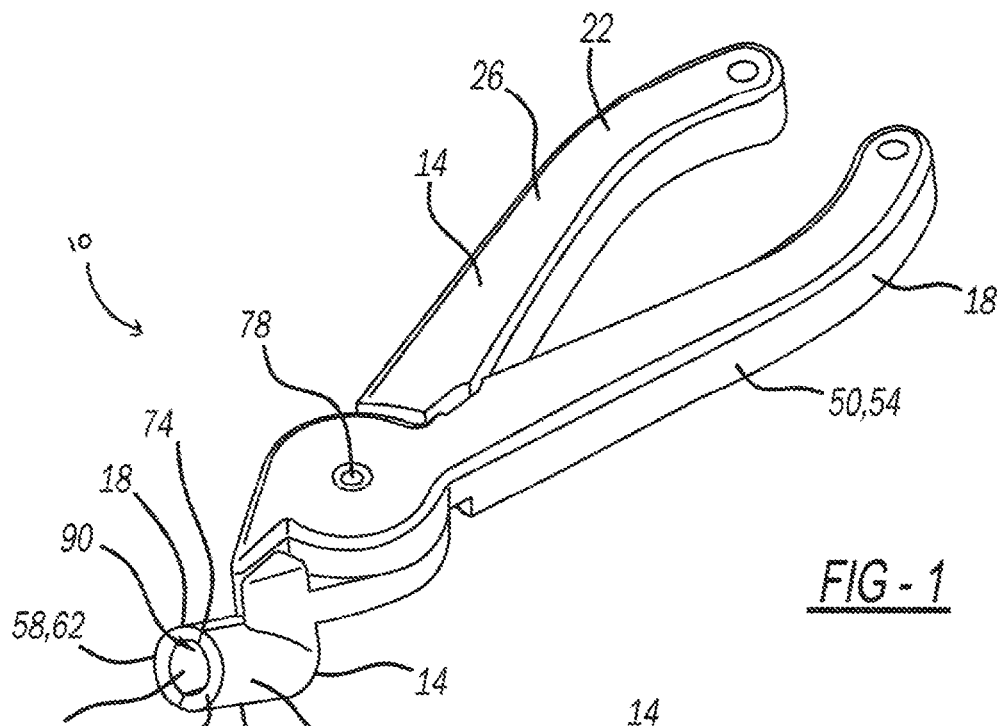
FIG. 1 is a schematic, perspective view of a crossbow bolt loader in a closed position.

Referring to FIGS. 1-9, wherein like reference numbers refer to like components, a bolt-loading apparatus 10 is schematically depicted. The apparatus 10 includes two members, namely, a first member 14 and a second member 18. The first member 14 has a first portion 22 defining a first handle 26. The first member 14 also has a second portion 30 defining a first hollow semi-cylinder 34. As used herein, a "semi-cylinder" is a half of a cylinder cut by a plane that extends along its longitudinal axis, and a "hollow semi-cylinder" is half of a hollow cylinder cut by a plane that extends along its longitudinal axis. More specifically, the second portion 30 defines a first concave surface 38 that defines a first semi-cylindrical cavity 42, and a semi-cylindrical outer surface 46.

Similarly, the second member 18 has a third portion 50 defining a second handle 54. The second member 18 also has a fourth portion 58 defining a second hollow semi-cylinder 62. More specifically, the fourth portion 58 defines a second concave surface 66 that defines a second semi-cylindrical cavity 70, and a semi-cylindrical outer surface 74.

The apparatus 10 also includes a pivot pin 78 that connects the first member 14 to the second member 18 such that the first and second members 14, 18 are rotatable with respect to each other about an axis 82. More specifically, the first member 14 is selectively rotatable with respect to the second member 18 about the axis 82 between a first position, as shown in FIGS. 1, 3, 5 and 9, and a second position, as shown in FIGS. 2 and 4.

The apparatus 10 is configured such that, when the first member 14 is in the first position with respect to the second member 18, as shown in FIGS. 1, 3, 5 and 9, the first hollow semi-cylinder 34 and the second hollow semi-cylinder 62 cooperate to define a complete hollow cylinder 86, with surfaces 38 and 66 cooperating to define a cylindrical passageway 90 through the cylinder 86.

Figure 2:
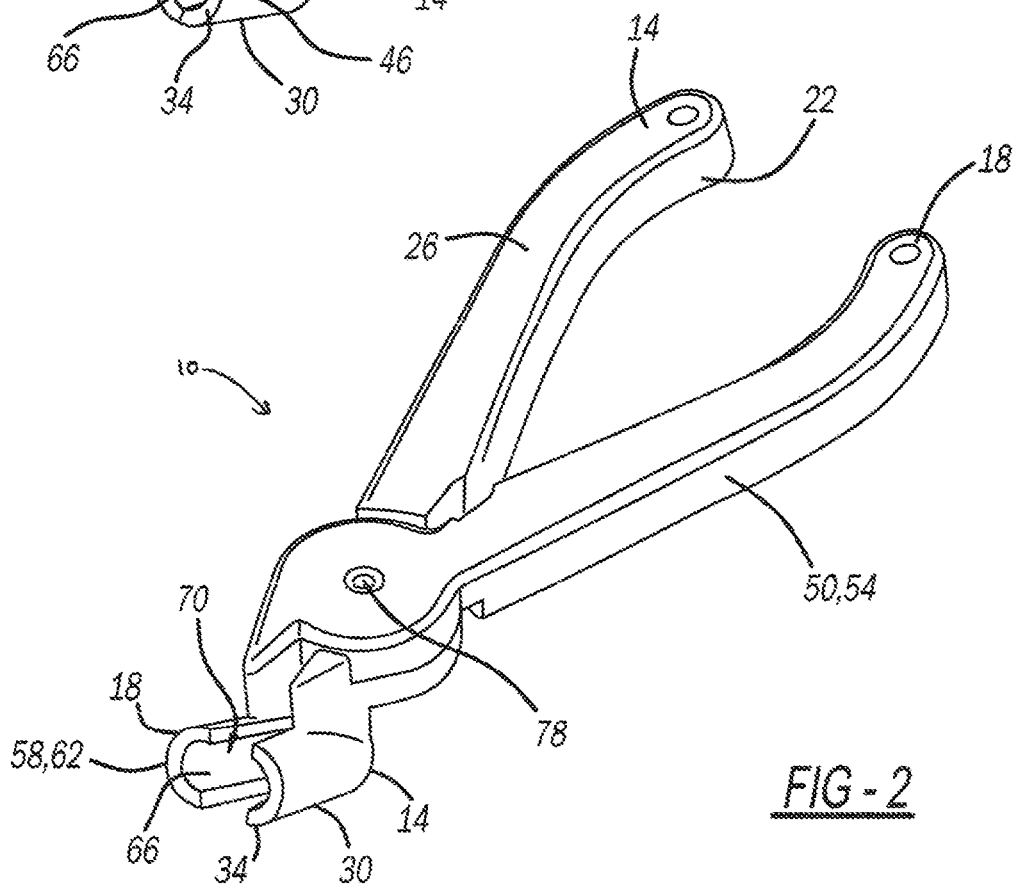
FIG. 2 is a schematic, perspective view of the crossbow bolt loader in an open position.
Figure 3:
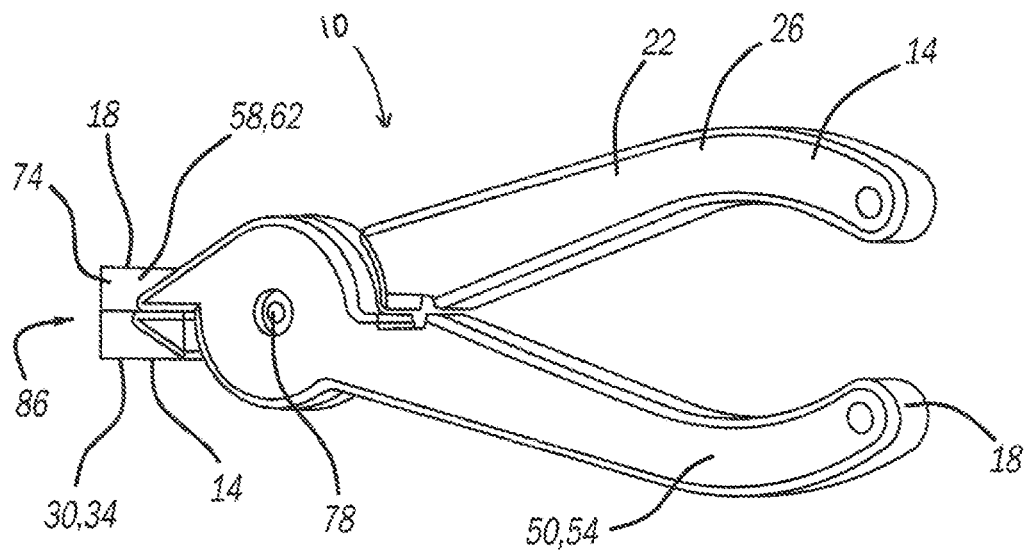
FIG. 3 is a schematic, top view of the crossbow bolt loader in the closed position.
Figure 4:
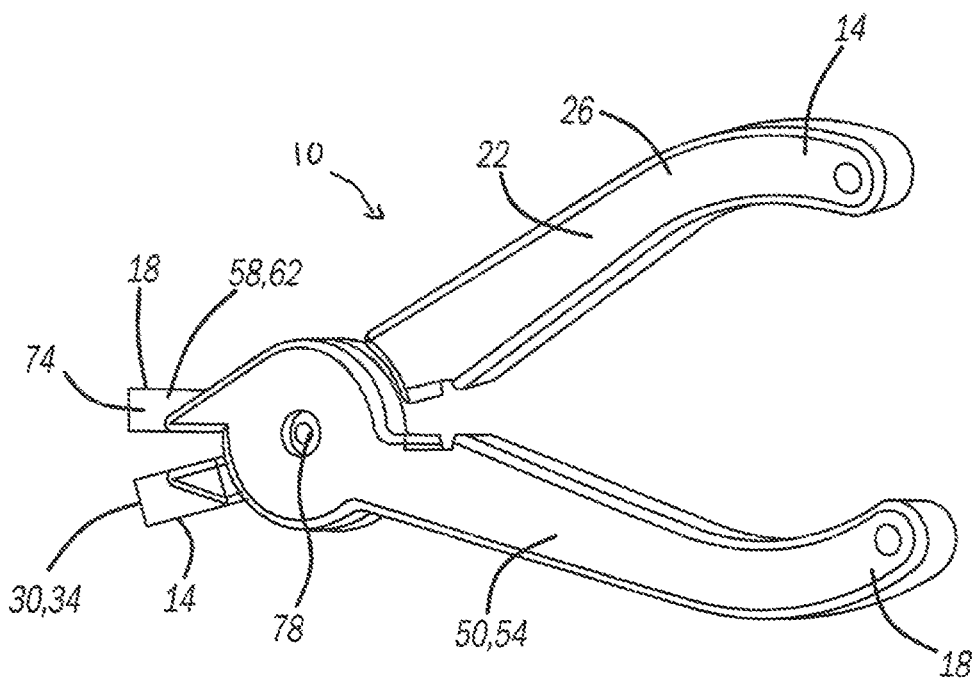
FIG. 4 is a schematic, top view of the crossbow bolt loader in the open position.
Figure 5:
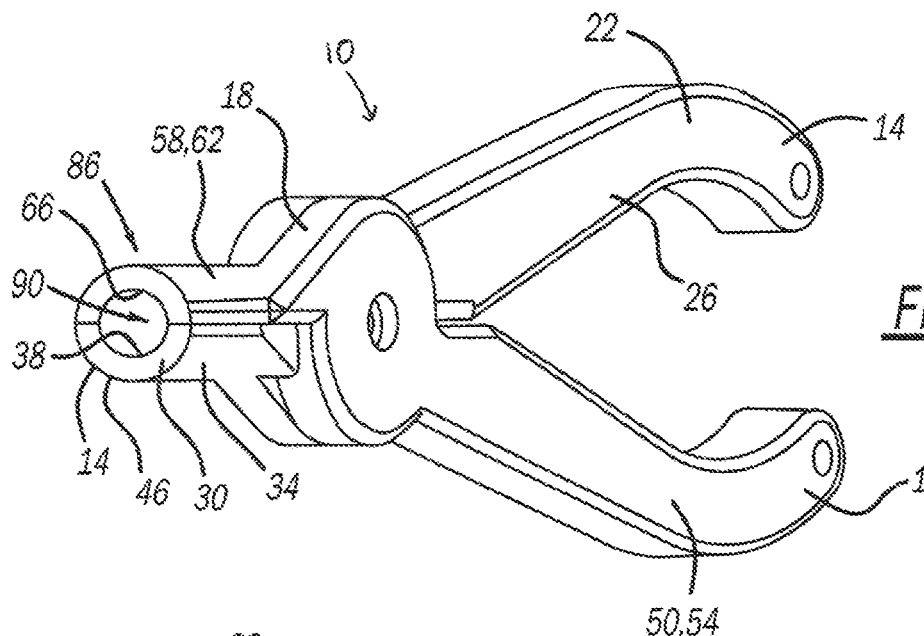
FIG. 5 is a schematic, front view of the crossbow bolt loader in the closed position.
Figure 6:
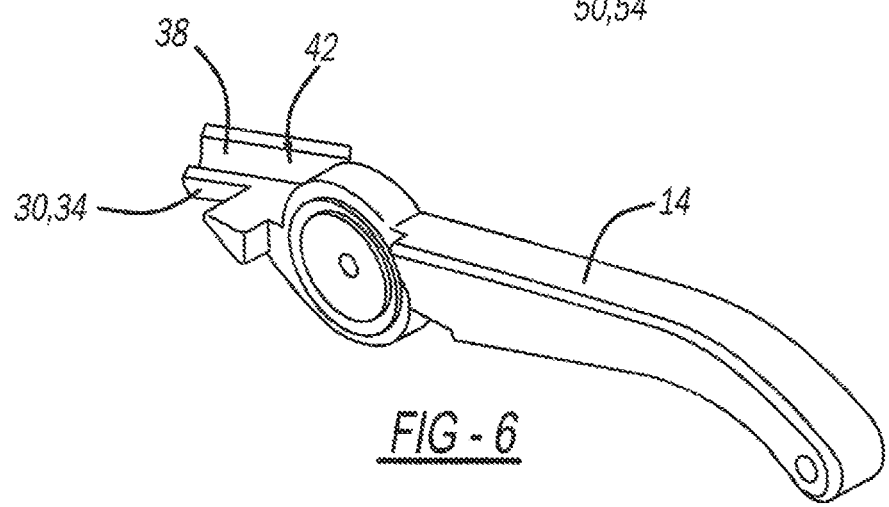
FIG. 6 is a schematic, perspective view of a first member of the crossbow bolt loader.
Figure 7:
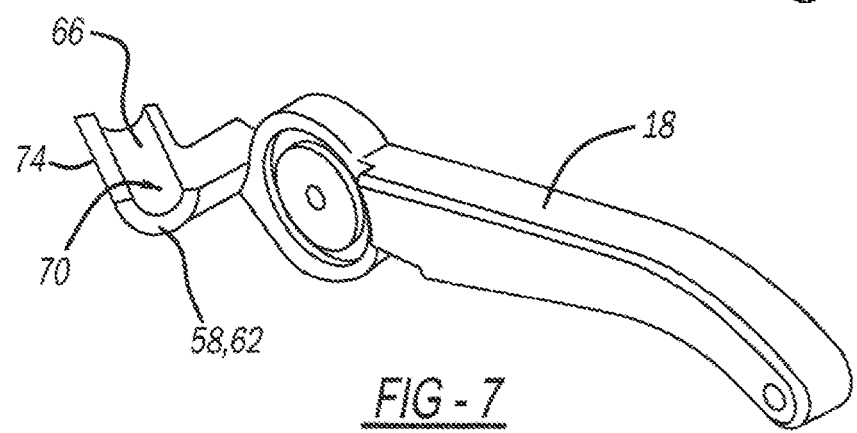
FIG. 7 is a schematic, perspective view of a second member of the crossbow bolt loader.

The apparatus 10 is configured such that, when the first member 14 is in the second position with respect to the second member 18, the first hollow semi-cylinder 34 and the second hollow semi-cylinder 62 are separated, as shown in FIGS. 2 and 4.

Figure 9:
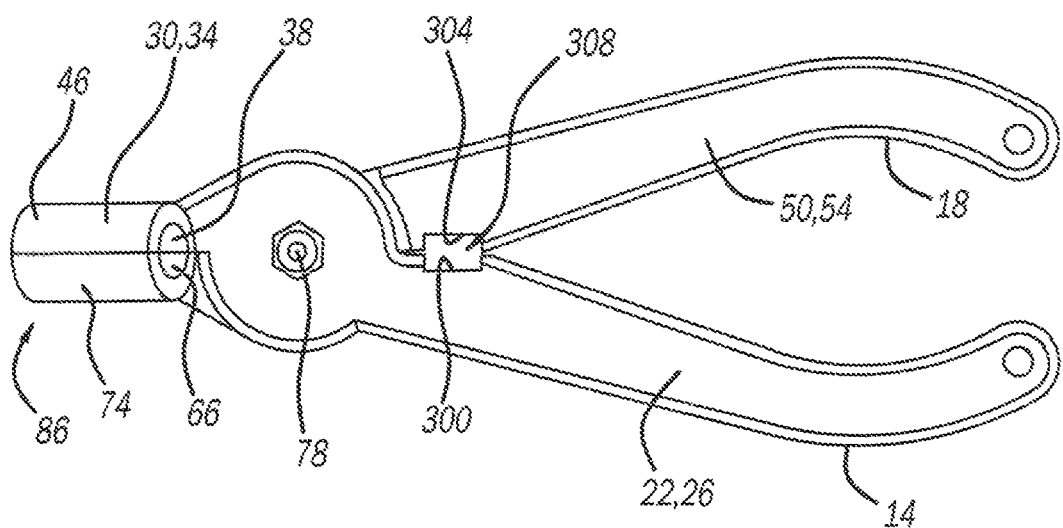
FIG. 9 is a schematic, bottom view of the crossbow bolt loader.
Figure 10:
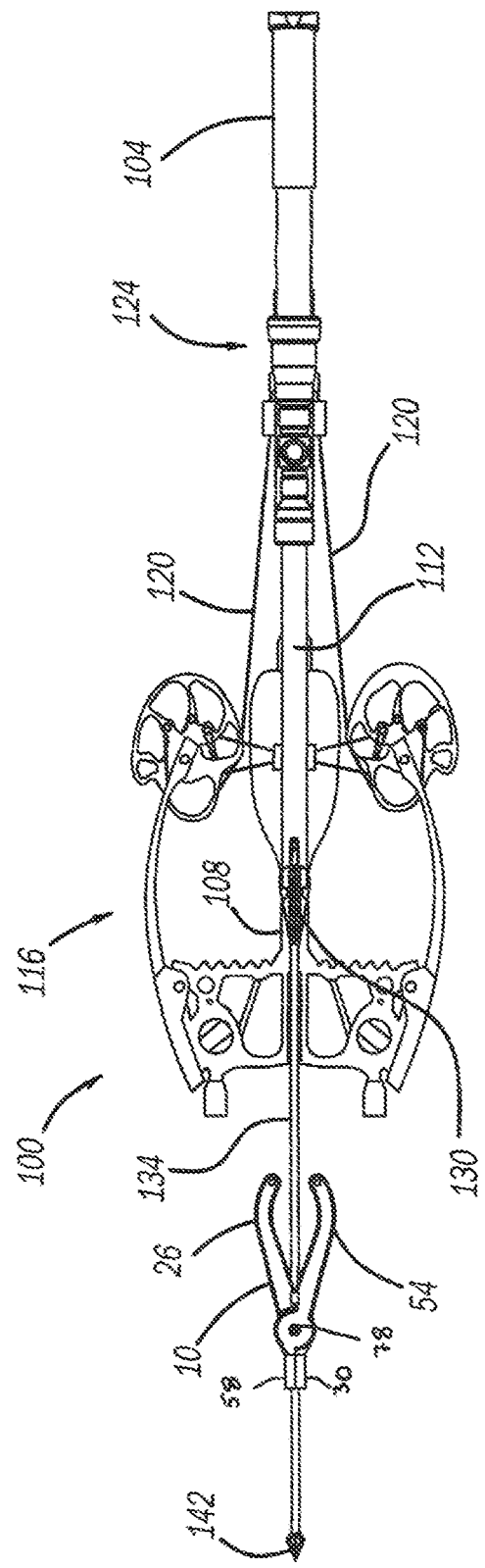
FIG. 10 is a schematic, top view of a crossbow.
Figure 11:
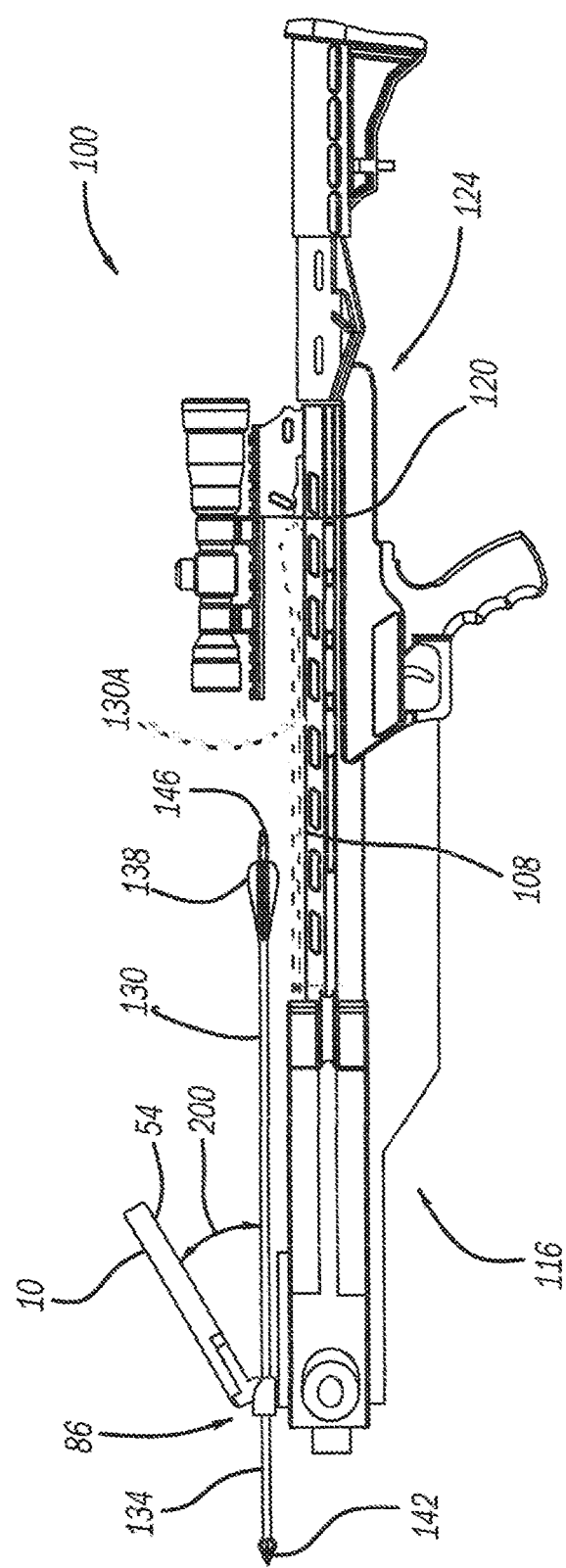
FIG. 11 is a schematic, side view of the crossbow of FIG. 10 being loaded by the crossbow bolt loader.

FIGS. 10 and 11 schematically depict a method of using the apparatus 10. Referring to FIGS. 10 and 11, wherein like reference numbers refer to like components from FIGS. 1-9, the method includes possessing a crossbow 100. The crossbow 100 includes a stock 104, a rail 108 defining a groove 112, a bow portion 116, a bowstring 120, and a bowstring locking mechanism 124 all operatively interconnected as understood by those skilled in the art.

The method also includes possessing a crossbow bolt 130 having a shaft 134 and a plurality of vanes 138 mounted to the shaft 134, as understood by those skilled in the art. The bolt 130 may include a head 142 at one end, and a nock 146 at the other, as understood by those skilled in the art. The method further includes possessing an apparatus 10 having at least one handle 26, 54 and a bolt retention portion (portions 30, 58) configured to releasably retain the shaft 134 of the crossbow bolt 130.

The method includes causing the bolt retention portion (30, 58) to retain the shaft 134 of the crossbow bolt 130. In the embodiment depicted, this includes manipulating the handles 26, 54 so that the first member 14 is in its second position with respect to the second member 18, and therefore the first hollow semi-cylinder 34 and the second hollow semi-cylinder 62 are separated, positioning the shaft 134 with respect to the apparatus 10 such that, when the first member 14 moves to its first position and the first and second hollow semi-cylinders 34, 62 move together to form the complete cylinder 86, the shaft 134 is disposed within, and extends through, the cylindrical passageway 90 as shown in FIGS. 10 and 11. The bolt 130 is thus captured within the cylindrical passageway 90 between the first and second portions 30, 58.

The method then includes holding handles 26, 54 and moving the apparatus 10 with the shaft 134 of the crossbow bolt 130 retained by the bolt retention portion such that at least a portion of the bolt 130 is disposed within the groove 112 of the rail 108. In one embodiment, one of the vanes 138 extends into the groove 112. Holding the handles 26, 54 and moving the apparatus 10 may include moving the apparatus 10 such that the bolt is in the position shown in phantom at 130A in FIG. 11, and more specifically the nock 146 is engaged with the bowstring 120 when the bowstring 120 is cocked, i.e., the bowstring 120 is engaged with the locking mechanism 124. The method then includes releasing the shaft 134 from the apparatus 10, which, in the embodiment depicted, includes moving the handles 26, 54 such that the first handle is in the second position and the semi-cylinders 34, 62 separate from each other.

Figure 8:
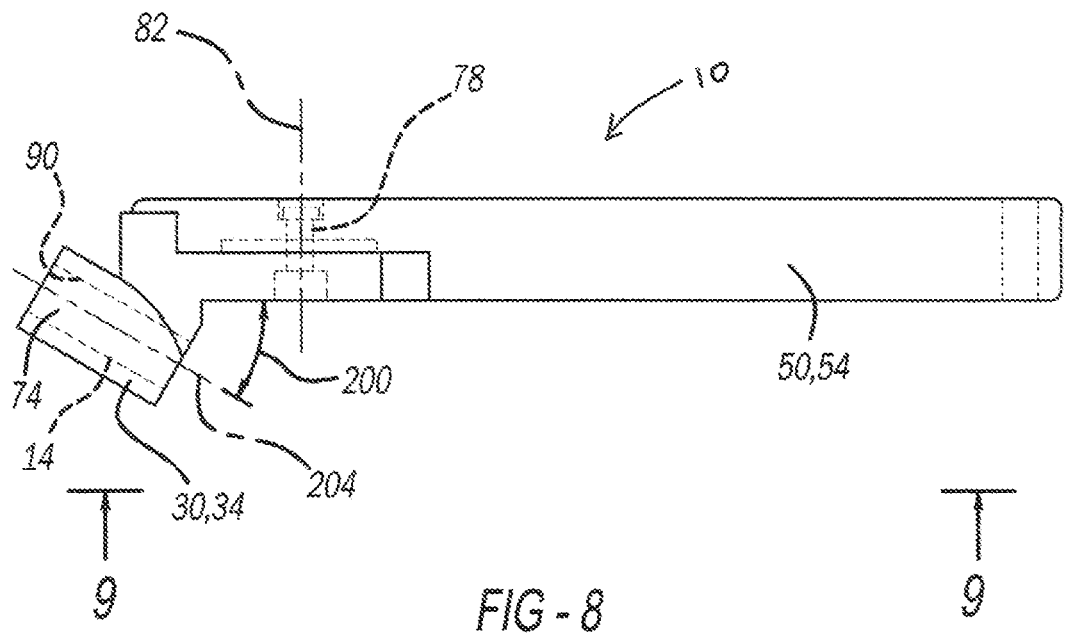
FIG. 8 is a schematic, side view of the crossbow bolt loader.

As best seen in FIGS. 8 and 11, the handles 26, 54 form an angle 200 with the centerline or axis 204 of the cylindrical passageway 90. The axis of the cylindrical shaft 134 is coextensive with the axis 204 of the passageway 90 when the shaft 134 extends through the passageway 90 (as shown in FIGS. 10 and 11). Accordingly, the angle 200 is also formed between the shaft 134 and the handles 26, 54. The angle 200 is preferably between 20 and 80 degrees, and more preferably between 25 and 45 degrees. In the embodiment depicted, the angle 200 is 30 degrees.

As best seen in FIG. 9, the first member 14 defines a first rectangular concavity 300 adjacent the first handle 26. Similarly, the second member 18 defines a second rectangular concavity 304 adjacent the second handle 54. The concavities 300, 304 are positioned such that, when the first member 14 is in the first position with respect to the second member 18, as shown in FIG. 9, the first and second concavities 300, 304 cooperate to define a rectangular aperture 308. The aperture 308 is sized such that the nock 146 of the bolt 130 is fittable inside the aperture 308. The apparatus 10 may be used to rotate the nock 146 with respect to the shaft 134.

Accordingly, the method may also include inserting the nock 146 into the aperture 308, and rotating either or both the apparatus 10 or the shaft 134, thereby causing rotation of the nock 146 until the nock 146 is at a desired angular position relative to the shaft 134.

Figure 12:
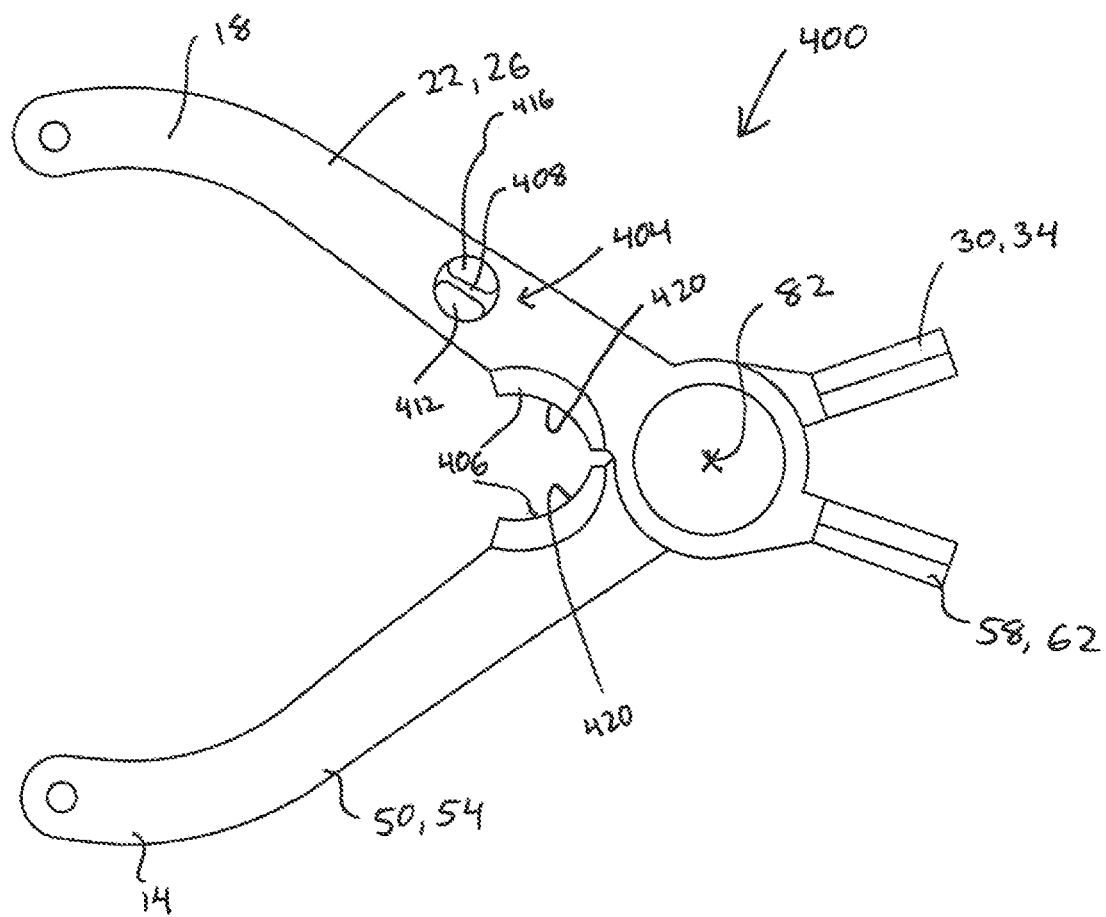
FIG. 12 is a schematic, side view of a crossbow bolt loader according to an alternative embodiment.

FIG. 12, wherein like reference numbers refer to like components from FIGS. 1-11, an alternative embodiment of the crossbow bolt loader 400 is schematically depicted. The crossbow bolt loader 400 is substantially identical to the crossbow bolt loader shown at 10 in FIGS. 1-11 except that one of the handles 26 defines a nock port 404, and the bolt loader 400 includes rubber inserts 406.

As understood by those skilled in the art, the end of a nock, such as the one shown at 146 in FIGS. 10 and 11, is generally circular with a groove that bisects the circle. The groove at the end of the nock 146 is configured to receive and retain the bowstring. The nock port 404 is formed in the surface of one of the handles 26. More specifically, the surface of the handle 26 defines a protuberant portion 408 that is fittable within the groove of the nock 146. The nock portion 404 may also define two concavities 412, 416, each of the concavities 412, 416 being on respective opposite sides of the protuberant portion 408. The nock port 404 is facilitates alignment of the nock 146 relative to the shaft 134. A method of using the nock port 404 includes inserting the protuberant portion 408 into the groove of the nock 146. The concavities 412, 416 accommodate the portions of the nock on either side of the groove; thus, portions of the nock enter the concavities. The interaction between the nock 146 and the nock port 404 prevents rotation of the nock 146 relative to the bolt loader 400. This enables the shaft 134 of the bolt 130 to be easily rotated relative to the nock 146.

Each rubber insert 406 is mounted to a respective one of the handles 26, 54 and define a respective concave surface 420. Surfaces 420 generally face one another such that movement of the first handle 26 from its second position to its first position brings surfaces 420 closer to one another. The rubber inserts 406 are usable to extinguish certain nocks and to pull crossbow bolts from targets. More specifically, the handles 26, 54 can be used to compress a bolt between the inserts 406 to provide the friction and force necessary to grasp the bolt for removal from a target.

While the best modes for carrying out the invention have been described in detail, those familiar with the art to which this invention relates will recognize various alternative designs and embodiments for practicing the invention within the scope of the appended claims.

The invention claimed is:

1. An apparatus for use with a crossbow bolt having a shaft and a nock with a groove, the apparatus comprising:
  a first member having a first portion defining a first handle and a second portion having a first surface defining a first cavity;

a second member having a third portion defining a second handle and a fourth portion having a second surface defining a second cavity;

said first and second cavities each having the shape of a cylinder segment;

said first and second members being operatively connected to each other such that the first and second members are rotatable with respect to each other about an axis;

wherein the first member is selectively rotatable with respect to the second member about the axis between a first position and a second position;

wherein the first surface and the second surface are sized and positioned such that the first and second surfaces cooperate to retain the shaft of the crossbow bolt when the shaft is between the first and second surfaces and the first member is in the first position with respect to the second member;

wherein the first surface and the second surface move away from each other when the first member is moved from the first position to the second position;

wherein the shaft of the crossbow bolt is characterized by a centerline; and wherein the apparatus is configured such that the centerline and the handles define an angle therebetween when the first and second surfaces cooperate to retain the shaft and wherein said angle is between 20 degrees and 80 degrees.

2. The apparatus of claim 1, wherein the angle is between 25 degrees and 45 degrees.

3. The apparatus of claim 2, wherein the angle is between 25 degrees and 35 degrees.

4. The apparatus of claim 1, further comprising a first elastomeric insert mounted to the first handle and a second elastomeric insert mounted to the second handle.

5. The apparatus of claim 1, wherein one of said first and second handles defines a protuberance that is fittable within the groove of the nock and two concavities on opposite sides of the protuberance.

6. A method comprising:
possessing a crossbow having a bowstring, a bowstring locking mechanism, and a rail defining a groove;
possessing a crossbow bolt having a shaft and a plurality of vanes mounted to the shaft;
possessing an apparatus having a first member having a first portion defining a first handle and a second portion having a first surface defining a first cavity,
a second member having a third portion defining a second handle and a fourth portion having a second surface defining a second cavity,
said first and second cavities each having the shape of a cylinder segment,
said first member being rotatable with respect to the second member between a first position and a second position;
said first surface being closer to the second surface when the first member is in the first position than when the first member is in the second position;
positioning the shaft with respect to the apparatus such that, when the first member moves to its first position, the first surface and the second surface cooperate with each other to retain the shaft of the crossbow bolt therebetween;
moving the first member to its first position thereby causing the apparatus to retain the shaft of the crossbow bolt between the first and second surfaces;
holding said first and second handles and moving the apparatus with the shaft of the crossbow bolt retained between the first and second surfaces such that at least a portion of the bolt is disposed within the groove.

7. The method of claim 6, wherein said holding said first and second handles and moving the apparatus includes moving the apparatus such that the bolt is engaged with the bowstring.

8. An apparatus for use with a crossbow bolt having a shaft and a nock with a groove, the apparatus comprising:
a first member having a first portion defining a first handle and a second portion having a first surface defining a first cavity;
a second member having a third portion defining a second handle and a fourth portion having a second surface defining a second cavity;
said first and second cavities each having the shape of a cylinder segment;
said first and second members being operatively connected to each other such that the first and second members are rotatable with respect to each other about an axis;
wherein the first member is selectively rotatable with respect to the second member about the axis between a first position and a second position;
wherein the first surface and the second surface are sized and positioned such that the first and second surfaces cooperate to retain the shaft of the crossbow bolt when the shaft is between the first and second surfaces and the first member is in the first position with respect to the second member;
wherein the first surface and the second surface move away from each other when the first member is moved from the first position to the second position;
wherein one of said first and second handles defines a protuberance that is fittable within the groove of the nock and two concavities on opposite sides of the protuberance.

* * * * *